United States Patent
Li et al.

(10) Patent No.: US 9,898,693 B2
(45) Date of Patent: Feb. 20, 2018

(54) DOCUMENT BACKGROUND SUPPRESSION PERFORMED DURING COLOR SPACE CONVERSION

(71) Applicant: Xerox Corporation, Norwalk, CT (US)

(72) Inventors: Xing Li, Webster, NY (US); Vignesh Doss, Theni (IN); Sainarayanan Gopalakrishnan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/059,748

(22) Filed: Mar. 3, 2016

(65) Prior Publication Data

US 2017/0255849 A1 Sep. 7, 2017

(51) Int. Cl.
*G06K 15/00* (2006.01)
*H04N 1/40* (2006.01)
*G06K 15/02* (2006.01)
*H04N 1/60* (2006.01)
*H04N 1/407* (2006.01)

(52) U.S. Cl.
CPC ..... *G06K 15/1878* (2013.01); *G06K 15/1822* (2013.01); *G06K 15/1882* (2013.01); *H04N 1/407* (2013.01); *H04N 1/6008* (2013.01); *H04N 1/6022* (2013.01); *H04N 1/6027* (2013.01)

(58) Field of Classification Search
CPC ........... G06K 15/1878; G06K 15/1822; H04N 1/407; H04N 1/6008; H04N 1/6022; H04N 1/6027

USPC .............. 358/2.1, 518, 1.9; 382/274
See application file for complete search history.

(56) References Cited

U.S. PATENT DOCUMENTS

| | | | |
|---|---|---|---|
| 5,157,740 A * | 10/1992 | Klein | ........ G06K 9/38 358/462 |
| 6,240,215 B1 | 5/2001 | Salgado et al. | |
| 6,618,171 B1 | 9/2003 | Tse et al. | |
| 7,058,222 B2 | 6/2006 | Li et al. | |
| 7,200,263 B2 | 4/2007 | Curry et al. | |
| 7,551,334 B2 | 6/2009 | Li | |
| 7,843,616 B2 * | 11/2010 | Li | ........ H04N 1/4072 358/1.9 |
| 7,873,232 B2 | 1/2011 | Malik | |
| 7,936,923 B2 | 5/2011 | Liu et al. | |
| 8,000,554 B2 | 8/2011 | Li et al. | |

(Continued)

*Primary Examiner* — Quang N Vo
(74) *Attorney, Agent, or Firm* — Gibb & Riley, LLC (57) ABSTRACT

An electronic image in a first color space, used by image acquisition devices, is obtained and converted into a second color space with a larger gamut, to produce a second color space image. Corrections are made to the second color space image to produce a corrected image, without performing background suppression. The corrected image is converted into a third color space, used by printing devices, to produce a third color space image, and this process of converting the corrected image into the third color space includes performing background suppression. This process of converting the corrected image into the third color space samples nodes of the second color space values, classifies the nodes as background nodes or non-background nodes, multiplies the second color space values of the background nodes by a percentage less than 100%, and after multiplying, interpolates values between the nodes.

20 Claims, 6 Drawing Sheets

(56) References Cited

U.S. PATENT DOCUMENTS

2002/0159080 A1* 10/2002 Feng .................... H04N 1/62
                                                      358/1.9
2004/0004731 A1*  1/2004 Itagaki ................ H04N 1/6094
                                                      358/1.9
2010/0067825 A1   3/2010 Zhou et al.

* cited by examiner

DOCUMENT BACKGROUND SUPPRESSION PERFORMED DURING COLOR SPACE CONVERSION

BACKGROUND

Systems and methods herein generally relate to processing and printing optically obtained image files, and more particularly to document background suppression.

While historically images were captured using photographic film, modern digital devices (such as scanners, cameras, etc.) capture images as pixels electronically, and most such digital devices capture images in a color space referred to as RGB, or red-green-blue color space. The RGB color space is utilized by image capture devices because such devices commonly includes pixel sensors that distinguish between the red, green, and blue colors.

When processing images captured by digital devices to make color corrections, remove undesirable artifacts, improve image resolution, suppress background, prepare images for printing or display, etc. (which is sometimes referred to as image path processing) it is often useful to first convert the electronic images into a color space that has a broader or greater spectrum, such as the L*a*b* color space.

The L*a*b* color space has an L dimension for lightness and a and b that are color-opponent dimensions, and are based on nonlinearly compressed coordinates. The L*a*b* color space includes all perceivable colors, which means that its gamut exceeds those of the RGB and CMYK color spaces, but the L*a*b*-color space is device independent, which means that the colors are defined independent of their nature of creation or the device they are displayed on.

Printing devices generally operate in a lower gamut color space, such as the RGB or CMYK color spaces, that are named based on the colors of the marking materials (e.g. inks, toners, etc.) used; such as red, green, and blue (RGB); or cyan, magenta, yellow, and black (CMYK).

Background suppression is a useful function provided by the image path in copiers and multi-functional systems that removes or unifies the color of the background in the digitally acquired image. Thus, the "background" is the color of the paper or other print media of the item that was scanned to create the digital image, and background suppression removes the background or makes the background uniform to make the electronic image appear more uniform and consistent.

One approach of performing background suppression is to apply a linear transformation (gain and offset) on the luminance channel of the image, augmented by some chrominance adjustment for background pixels. One side effect of such approaches can be an undesirable color appearance change in the image. Some background suppression methods improve automatic dynamic range adjustment; however, such methods add processing time, which impacts system performance. Additional methods of background suppression clip pixel values above a determined white point (where the pixel is set to white if the input value is above the determined white point); however, such approaches can produce visible switching artifacts. What is desirable is a computationally efficient background suppression method that does not introduce unwanted color appearance change and does not produce switching artifacts.

SUMMARY

Exemplary methods herein obtain an electronic image in a first (e.g., RGB) color space, used by image acquisition devices, and convert the electronic image into a second (e.g., L*a*b*) color space to produce a second color space image. The second color space has a gamut that exceeds the first color space. Such methods perform corrections to the second color space image to produce a corrected image, without performing background suppression. These methods also convert the corrected image into a third (e.g., CMYK) color space, used by printing devices, to produce a third color space image, and this process of converting the corrected image into a third color space includes performing background suppression.

More specifically, the process of converting the corrected image into the third color space samples nodes of the second color space values (the nodes are less than a full gamut of the second color space); classifies the nodes as background nodes or non-background nodes multiplies the second color space values of the background nodes by a percentage less than 100% and, after multiplying, interpolates values between the nodes.

Such processing determines whether the nodes match the color of print media within the electronic image. The process of classifying the nodes as background nodes or non-background nodes is based on the nodes matching the color of the print media. Also, the process of multiplying the second color space values varies the percentage multiplier based on how closely the nodes match the color of print media. These methods print the third color space image to produce a printed document and obtain user feedback for the printed document. This allows these methods to vary the percentage multiplier based on the user feedback.

Exemplary printing devices herein include, among other components, an optical scanner that obtains an electronic image in a first (e.g., RGB) color space, and a processor (electrically connected to the optical scanner) that converts the electronic image into a second (e.g., L*a*b*) color space to produce a second color space image. Again, the second color space has a gamut that exceeds the first color space. The processor performs corrections to the second color space image to produce a corrected image, without performing background suppression. The processor converts the corrected image into a third (e.g., CMYK) color space to produce a third color space image, and the process of converting the corrected image into the third color space includes performing background suppression.

More specifically, the processor converts the corrected image into the third color space by sampling nodes of the second color space values. The nodes are less than a full gamut of the second color space. This conversion process also classifies the nodes as background nodes or non-background nodes, multiplies the second color space values of the background nodes by a percentage less than 100%, and after the multiplying, interpolates values between the nodes.

The processor also determines whether the nodes match the color of the print media within the electronic image. The processor classifies the nodes as the background nodes or the non-background nodes based on the nodes matching the color of print media. Also, the processor varies the percentage that is multiplied by the second color space values, based on how closely the nodes match the color of print media.

A printing engine and user interface are also electrically connected to the processor. The printing engine prints the third color space image, and the user interface obtains user feedback to the printed document. The processor varies the percentage multiplier based on the user feedback.

Exemplary systems herein include any form of image acquisition device obtaining an electronic image in a first (e.g., RGB) color space (e.g., scanner, camera, etc.) and a processor directly or indirectly connected to the image acquisition device. The processor converts the electronic image into a second (e.g., L*a*b*) color space to produce a second color space image. Again, the second color space has a gamut that exceeds the first color space. The processor performs corrections to the second color space image to produce a corrected image, without performing background suppression. The processor converts the corrected image into a third (e.g., CMYK) color space to produce a third color space image, and the process of converting the corrected image into the third color space includes performing background suppression.

More specifically, the processor converts the corrected image into the third color space by sampling nodes of the second color space values (the nodes are less than a full gamut of the second color space); classifying the nodes as background nodes or non-background nodes; multiplying the second color space values of the background nodes by a percentage less than 100%; and, after multiplying, interpolating values between the nodes.

The processor also determines whether the nodes match the color of the print media within the electronic image. The processor classifies the nodes as background nodes or non-background nodes based on whether the nodes match the color of print media. Additionally, the processor varies the percentage multiplied by the second color space values based on how closely the nodes match the color of print media.

Such systems also include a printer and a user interface directly or indirectly connected to the processor. The printer prints the third color space image. The user interface obtains user feedback for the printed document, and the processor varies the percentage multiplier based on the user feedback.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
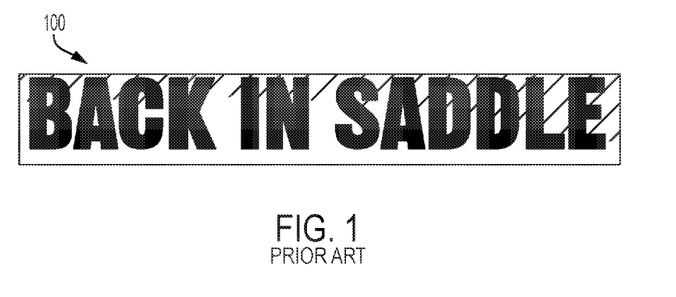
FIG. 1 is a schematic diagram illustrating processing performed by conventional systems, methods, and devices.

As mentioned above, what is desirable is a computationally efficient background suppression method that does not introduce unwanted color appearance change and does not produce switching artifacts (and such are illustrated in FIG. 1, which shows a copy of a portion of a newspaper 100 reproduced conventionally with unwanted color appearance change and switching artifacts). In view of this, the systems and methods herein provide a computationally efficient model to suppress the background during color space transformation, so that instead of performing background suppression while the image is in the L*a*b* color space, with methods, devices, and systems herein, background suppression is integrated with the L*a*b* to CMYK conversion. More specifically, these methods, devices, and systems modify the tetrahedral interpolation nodes in the L*a*b*—CMYK conversion to achieve background suppression. This eliminates the dedicated background suppression module and also addresses the image quality issues in existing methods.

In printing devices, such as multi-function devices (MFDs), most of the copy path functionalities (image path processing) are handled in L*a*b* color space and then the processed image is converted to CMYK color space for printing. This L*a*b* to CMYK color space transformation uses tetrahedral interpolation to attain quick and low computation cost conversion.

Tetrahedral interpolation is a node based process, in which 'n' nodes of L*a*b* values are selected to sample the entire L*a*b* gamut, for all the selected L*a*b* nodes their corresponding CMYK values are computed and stored in a look-up table. For input L*a*b* values which are not in the table, output CMYK values are interpolated using values in adjacent nodes.

The methods, devices, and systems herein make use of the fact that values generated via interpolation form gradual transitions between nodes. By integrating background suppression functionality in the L*a* b* to CMYK conversion process, methods, devices, and systems herein not only eliminate one processing step but also achieves smooth transition near white point, as shown in item 102 in FIG. 2. As additional options, extra "transitioning nodes" can be designated between background (white) nodes and non-background (non-white) nodes to achieve the desired behavior, such as the uniform background shown in item 104, in FIG. 3. The transitioning nodes take a fraction of their "original" CMYK values, CMYK values before the integration of the background suppression function.

Figure 2:
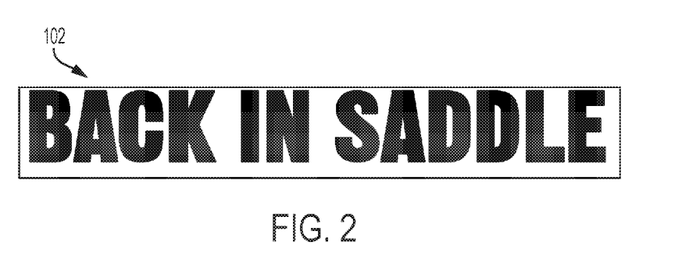
FIG. 2 is a schematic diagram illustrating processing performed by systems, methods, and devices herein.
Figure 3:
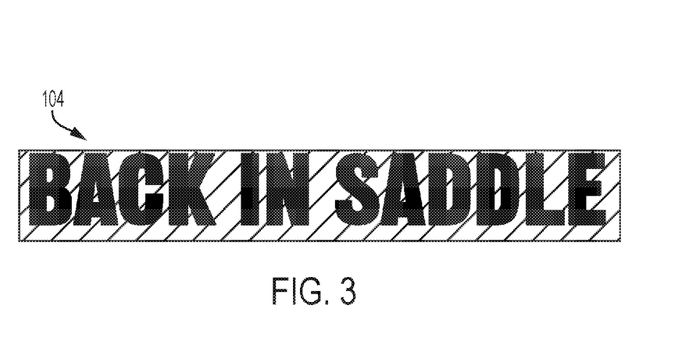
FIG. 3 is a schematic diagram illustrating processing performed by systems, methods, and devices herein.

The following cases shown in FIGS. 2 and 3 illustrate two different levels of background suppression integrated into the tetrahedral interpolation based color space transformation by methods, devices, and systems herein. For illustration purpose consider L*a*b* input for tetrahedral based interpolation node interval as:

L*=[0 17 34 51 68 85 102 119 136 153 170 187 204 221 238 255];

a*=[0 38 53 68 83 98 113 128 143 158 173 188 203 218 237 255];

b*=[0 58 72 86 100 115 128 142 156 170 184 198 212 226 240 255];

Case 1: (item 102 in FIG. 2, showing more aggressive background suppression)

| When nodes of | | | Assign |
|---|---|---|---|
| L* = 238,255 | a* = 113,128,143 | b* = 115,128,142 | → CMYK = 0 |
| L* = 221 | a* = 113,128,143 | b* = 115,128,142 | → CMYK = 10% of actual value |
| L* = 204 | a* = 113,128,143 | b* = 115,128,142 | → CMYK = 20% of actual value |
| L* = 187 | a* = 113,128,143 | b* = 115,128,142 | → CMYK = 30% of actual value |

Case 2: (item 104 in FIG. 3, showing less aggressive background suppression)

| When nodes of | | | Assign |
|---|---|---|---|
| L* = 238,255 | a* = 113,128,143 | b* = 115,128,142 | → CMYK = 0 |
| L* = 221 | a* = 113,128,143 | b* = 115,128,142 | → CMYK = 30% of actual value |
| L* = 204 | a* = 113,128,143 | b* = 115,128,142 | → CMYK = 60% of actual value |

The methods, devices, and systems herein provide a background-suppressed image without introducing switching artifacts. Further, with methods, devices, and systems herein, the weights can be adjusted based on different modes of printing such as photo, text, magazine, etc.

Figure 4:
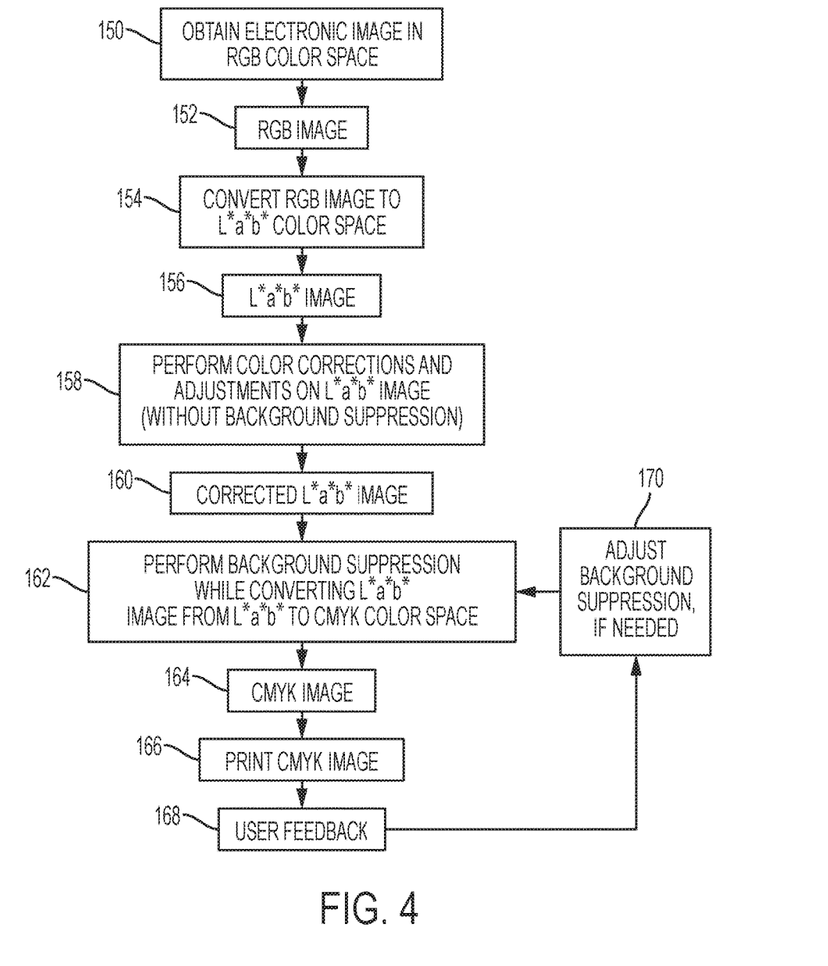
FIG. 4 is a flow diagram of various methods herein.

FIG. 4 is flowchart illustrating exemplary methods herein. In item 150, these methods obtain an electronic image in a first (e.g., RGB) color space, used by image acquisition devices, such as cameras, scanners, etc. The RGB image obtained is shown as item 152. In item 154, these methods convert the electronic image into a second (e.g., L*a*b*) color space to produce a second color space image (L*a*b* image 156). The second color space has a gamut that exceeds the first color space. As shown in item 158, these methods perform corrections to the second color space image (e.g., making color corrections, removing undesirable artifacts, improving image resolution, preparing images for printing or display, etc.) to produce a corrected image (corrected L*a*b* image 160), without performing background suppression.

As shown in item 162, these methods also convert the corrected image into a third (e.g., CMYK) color space, used by printing devices, to produce a third color space image (CMYK image 164), and this process of converting the corrected image into a third color space includes performing background suppression. The processing occurring in item 162 is shown more specifically in FIG. 5.

Figure 5:
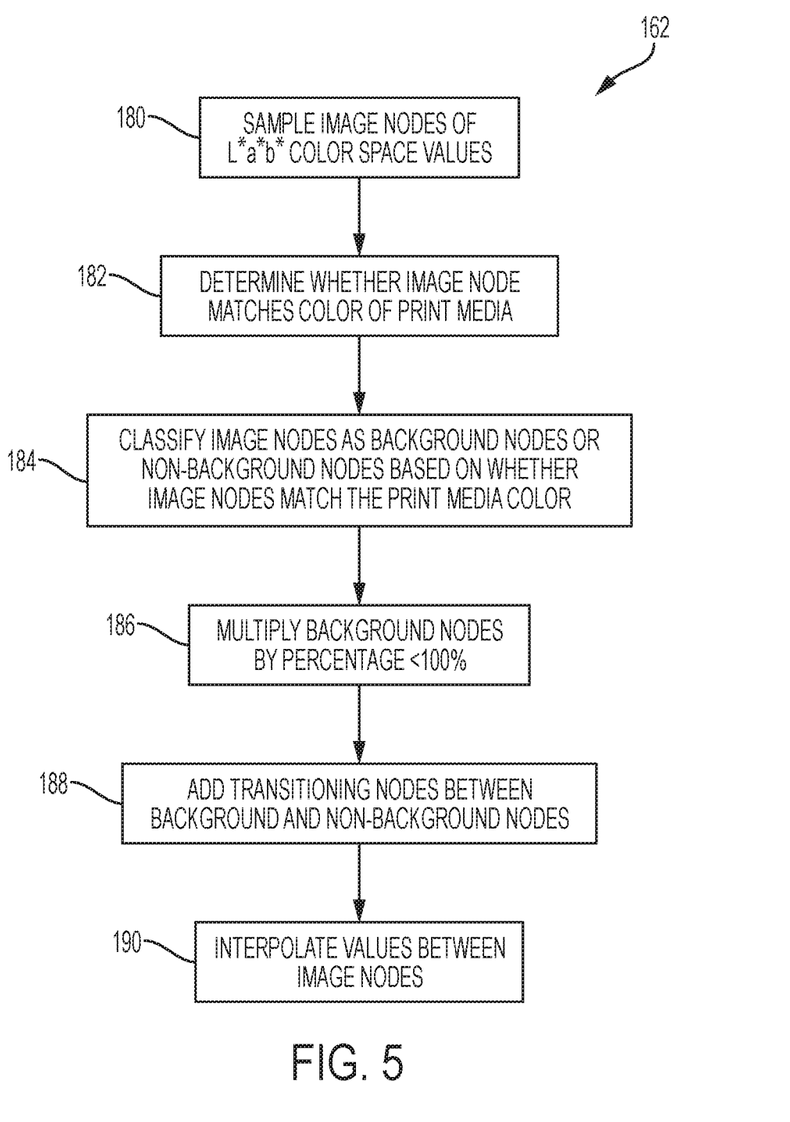
FIG. 5 is a flow diagram of various methods herein.

Thus, the process of converting the corrected image into the third color space 162 samples nodes of the second color space values (the nodes are less than a full gamut of the second color space), as shown in item 180 in FIG. 5. In item 182, these methods determine whether the nodes match the color of print media (match the background) within the electronic image. Item 184 in FIG. 5 classifies the nodes as background nodes or non-background nodes based on whether the nodes match the color of the print media. Item 186 in FIG. 5 multiplies the second color space values of the background nodes by a percentage less than 100% (e.g., 60%, 30%, 10% 0%, etc.). The process of multiplying the second color space values in item 186 varies the percentage multiplier based on how closely the nodes match the color of print media. Additionally, the percentage multiplier can be adjusted based on different modes of printing such as photo, text, magazine, etc. Optionally, as shown in item 188, such methods can add transitioning nodes between background and non-background nodes. After the multiplying in item 186, such methods interpolate values between the nodes, in item 190.

Referring back to FIG. 4, as shown in item 166 these methods print the third color space image to produce a printed document and, in item 168, obtain user feedback for the printed document. For example, user feedback can relate to there being too much or too little background suppression, there being inconsistent background suppression, etc. This allows these methods to vary the percentage multiplier based on the user feedback to adjust background suppression, if needed, as shown in item 170.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to perform the color space conversion and background suppression performed by the methods discussed above, the manual process would be sufficiently inaccurate and take an excessive amount of time so as to render the manual classification results useless. Specifically, processes such as color space conversion and background suppression, etc., requires the utilization of different specialized machines, and humans performing such processing would not produce useful results because of the time lag, inconsistency, and inaccuracy humans would introduce into the results. Additionally, processes such as image acquisition, processing of the image, printing, etc., require the utilization of different specialized machines. Therefore, for example, the methods described above cannot be performed manually (because it would take decades or lifetimes) and are integral with the processes performed by methods herein. In other words, these various machines (scanner, camera, printer, processor, etc.) are integral with the methods herein because the methods cannot be performed without the machines (and cannot be performed by humans alone).

Additionally, the methods herein solve many highly complex technological problems. For example, as mentioned above, one problem is the lack of a computationally efficient background suppression method that does not introduce unwanted color appearance change and does not produce switching artifacts. Methods herein solve this technological problem by provide a computationally efficient model to suppress the background during color space transformation, so that instead of performing background suppression while the image is in the L*a*b* color space, with methods, devices, and systems herein, background suppression is integrated with the L*a*b* to CMYK conversion. This reduces the amount of electronic storage and processing capability that a manufacturer must include within its devices. By granting such benefits, the methods herein reduce the amount and complexity of hardware needed to be purchased, installed, and maintained within equipment, thereby solving a substantial technological problem that providers experience today.

Figure 6:
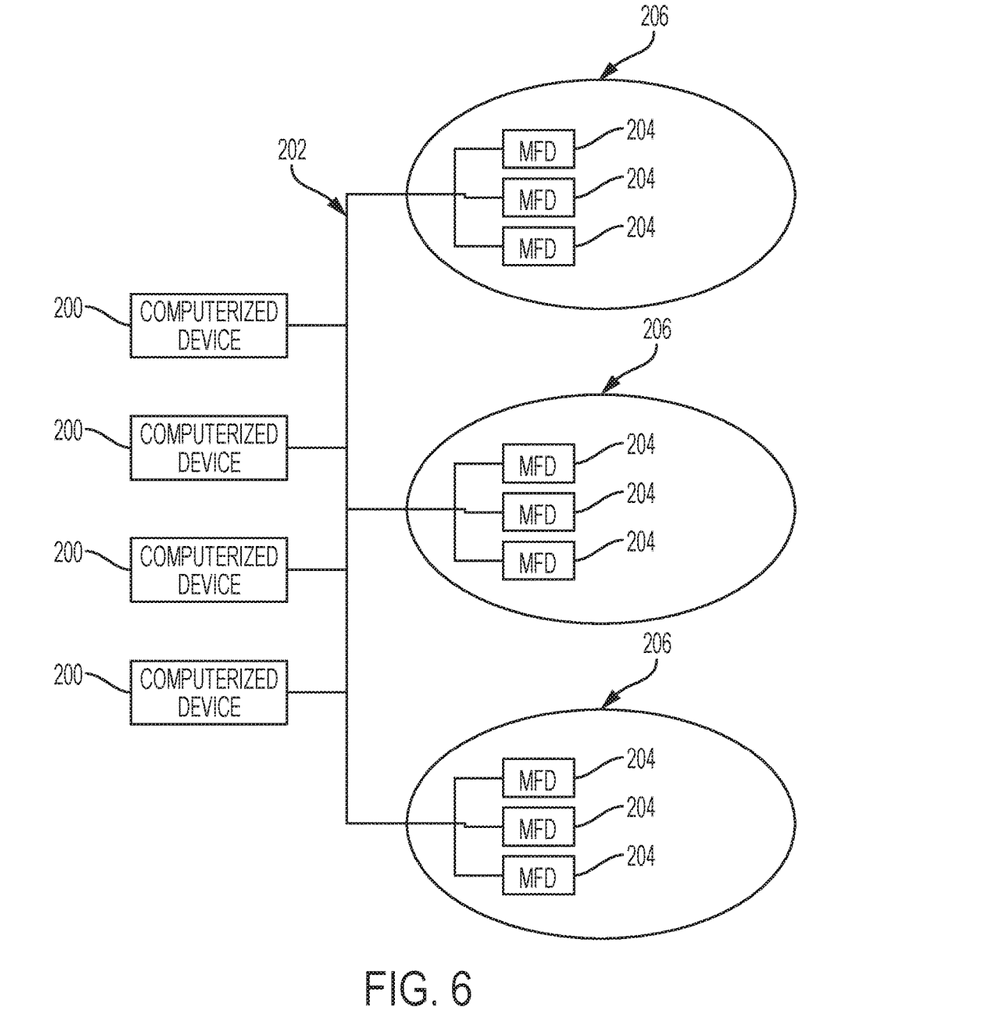
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
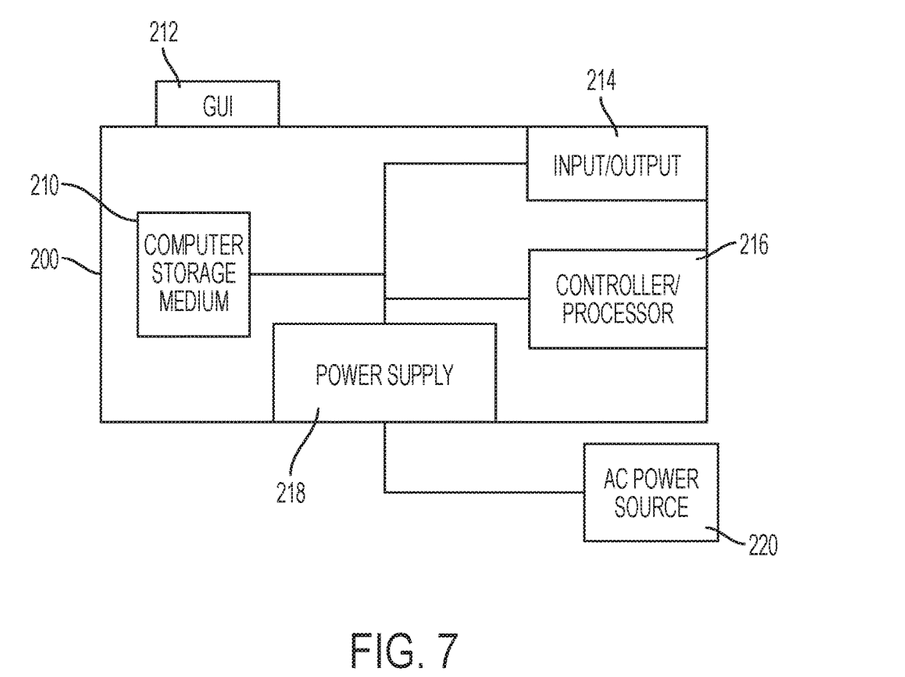
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc), etc.

Figure 8:
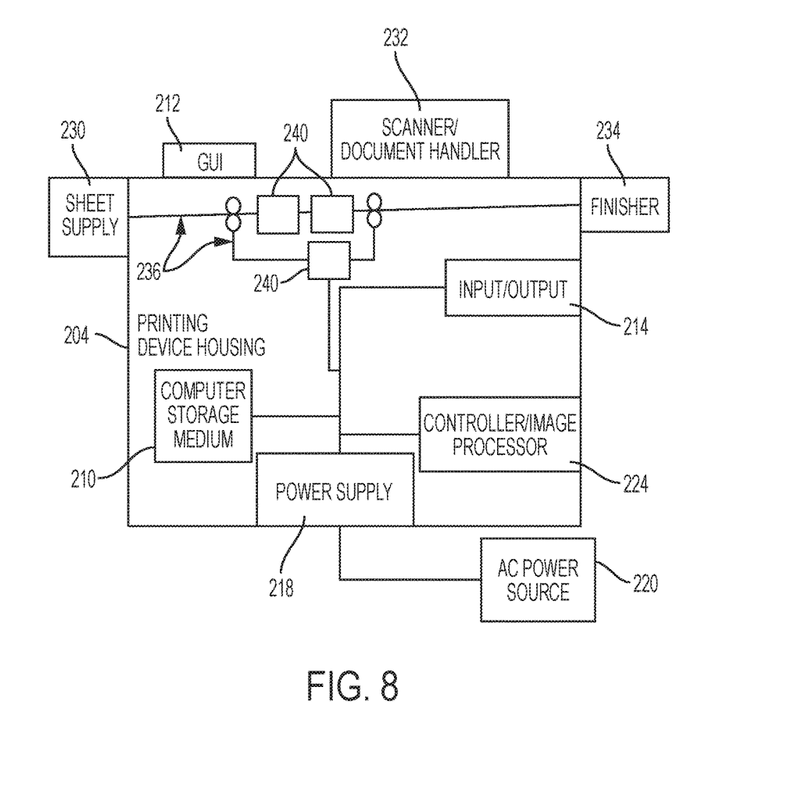
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 8 is only one example and the systems and methods herein are equally applicable to other types of printing devices that may include fewer components or more components. For example, while a limited number of printing engines and paper paths are illustrated in FIG. 8, those ordinarily skilled in the art would understand that many more paper paths and additional printing engines could be included within any printing device used with systems and methods herein. Exemplary printing devices herein include, among other components, an optical scanner 232 that obtains an electronic image in a first (e.g., RGB) color space, and a processor 224 (electrically connected to the optical scanner 232) that converts the electronic image into a second (e.g., L*a*b*) color space to produce a second color space image. Again, the second color space has a gamut that exceeds the first color space. The processor 224 performs corrections to the second color space image to produce a corrected image, without performing background suppression. The processor 224 converts the corrected image into a third (e.g., CMYK) color space to produce a third color space image, and the process of converting the corrected image into the third color space includes performing background suppression.

More specifically, the processor 224 converts the corrected image into the third color space by sampling nodes of the second color space values. The nodes are less than a full gamut of the second color space. This conversion process also classifies the nodes as background nodes or non-background nodes, multiplies the second color space values of the background nodes by a percentage less than 100%, and after the multiplying, interpolates values between the nodes.

The processor 224 also determines whether the nodes match the color of the print media within the electronic image. The processor 224 classifies the nodes as the background nodes or the non-background nodes based on the nodes matching the color of print media. Also, the processor 224 varies the percentage that is multiplied by the second color space values, based on how closely the nodes match the color of print media.

A printing engine 240 and user interface are also electrically connected to the processor 224. The printing engine 240 prints the third color space image, and the user interface obtains user feedback to the printed document. The processor 224 varies the percentage multiplier based on the user feedback.

Exemplary systems herein include any form of image acquisition device obtaining an electronic image in a first (e.g., RGB) color space (e.g., scanner 232, camera, etc.) and a processor 224 directly or indirectly connected to the image acquisition device. The processor 224 converts the electronic image into a second (e.g., L*a*b*) color space to produce a second color space image. Again, the second color space has a gamut that exceeds the first color space. The processor 224 performs corrections to the second color space image to produce a corrected image, without performing background suppression. The processor 224 converts the corrected image into a third (e.g., CMYK) color space to produce a third color space image, and the process of converting the corrected image into the third color space includes performing background suppression.

More specifically, the processor 224 converts the corrected image into the third color space by sampling nodes of the second color space values (the nodes are less than a full gamut of the second color space); classifying the nodes as background nodes or non-background nodes; multiplying the second color space values of the background nodes by a percentage less than 100%; and, after multiplying, interpolating values between the nodes.

The processor 224 also determines whether the nodes match the color of the print media within the electronic image. The processor 224 classifies the nodes as background nodes or non-background nodes based on whether the nodes match the color of print media. Additionally, the processor 224 varies the percentage multiplied by the second color space values based on how closely the nodes match the color of print media.

Such systems also include a printer 204 and a user interface directly or indirectly connected to the processor 224. The printer 204 prints the third color space image. The user interface obtains user feedback for the printed document, and the processor 224 varies the percentage multiplier based on the user feedback.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   obtaining an electronic image in a first color space used by image acquisition devices;
   converting said electronic image into a second color space to produce a second color space image, said second color space having a gamut that exceeds said first color space;
   performing corrections to said second color space image to produce a corrected image without performing background suppression; and
   converting said corrected image into a third color space used by printing devices to produce a third color space image, said converting said corrected image into said third color space includes performing background suppression.

2. The method according to claim 1, said converting said corrected image into said third color space comprising:
   sampling nodes of said second color space values, said nodes being less than a full gamut of said second color space;
   classifying said nodes as background nodes or non-background nodes;
   multiplying said second color space values of said background nodes by a percentage less than 100%; and
   after said multiplying, interpolating values between said nodes.

3. The method according to claim 2, further comprising determining whether said nodes match a color of print media within said electronic image,
   said classifying said nodes as said background nodes or said non-background nodes being based on said nodes matching said color of print media.

4. The method according to claim 3, said multiplying said second color space values varies said percentage based on how closely said nodes match said color of print media.

5. The method according to claim 2, further comprising:
   printing said third color space image to produce a printed document;
   obtaining user feedback for said printed document; and
   varying said percentage based on said user feedback.

6. A method comprising:
   obtaining an electronic image in RGB color space;
   converting said electronic image into L*a*b* color space to produce a L*a*b* image;
   performing corrections to said L*a*b* image to produce a corrected L*a*b* image without performing background suppression; and
   converting said corrected L*a*b* image into CMYK color space to produce a CMYK image, said converting said corrected L*a*b* image into said CMYK color space includes performing background suppression.

7. The method according to claim 6, said converting said corrected L*a*b* image into CMYK color space comprising:
   sampling nodes of said L*a*b* color space values, said nodes being less than a full gamut of said L*a*b* color space;
   classifying said nodes as background nodes or non-background nodes;
   multiplying said L*a*b* color space values of said background nodes by a percentage less than 100%; and
   after said multiplying, interpolating values between said nodes.

8. The method according to claim 7, further comprising determining whether said nodes match a color of print media within said electronic image,
   said classifying said nodes as said background nodes or said non-background nodes being based on said nodes matching said color of print media.

9. The method according to claim 8, said multiplying said L*a*b* color space values varies said percentage based on how closely said nodes match said color of print media.

10. The method according to claim 7, further comprising:
    printing said CMYK image to produce a printed document;
    obtaining user feedback for said printed document; and
    varying said percentage based on said user feedback.

11. A printing device comprising:
    an optical scanner obtaining an electronic image in a first color space;
    a processor electrically connected to said optical scanner, said processor converting said electronic image into a second color space to produce a second color space image, said second color space having a gamut that exceeds said first color space, said processor performing corrections to said second color space image to produce a corrected image without performing background suppression, said processor converting said corrected image into a third color space to produce a third color space image, and said converting said corrected image into said third color space includes performing background suppression; and
    a printing engine electrically connected to said processor, said printing engine printing said third color space image to produce a printed document.

12. The printing device according to claim 11, said processor converting said corrected image into said third color space by:
    sampling nodes of said second color space values, said nodes being less than a full gamut of said second color space;
    classifying said nodes as background nodes or non-background nodes;
    multiplying said second color space values of said background nodes by a percentage less than 100%; and
    after said multiplying, interpolating values between said nodes.

13. The printing device according to claim 12, said processor further determining whether said nodes match a color of print media within said electronic image,
    said processor classifying said nodes as said background nodes or said non-background nodes based on said nodes matching said color of print media.

14. The printing device according to claim 13, said processor multiplying said second color space values varies said percentage based on how closely said nodes match said color of print media.

15. The printing device according to claim 12, further comprising a user interface electrically connected to said processor,
    said user interface obtaining user feedback for said printed document, and
    said processor varying said percentage based on said user feedback.

16. A system comprising:
    an image acquisition device obtaining an electronic image in a first color space;
    a processor directly or indirectly connected to said image acquisition device, said processor converting said electronic image into a second color space to produce a second color space image, said second color space having a gamut that exceeds said first color space, said processor performing corrections to said second color space image to produce a corrected image without performing background suppression, said processor converting said corrected image into a third color space to produce a third color space image, and said converting said corrected image into said third color space includes performing background suppression; and
    a printer directly or indirectly connected to said processor, said printer printing said third color space image to produce a printed document.

17. The system according to claim 16, said processor converting said corrected image into said third color space by:
    sampling nodes of said second color space values, said nodes being less than a full gamut of said second color space;
    classifying said nodes as background nodes or non-background nodes;
    multiplying said second color space values of said background nodes by a percentage less than 100%; and
    after said multiplying, interpolating values between said nodes.

18. The system according to claim 17, said processor further determining whether said nodes match a color of print media within said electronic image,
    said processor classifying said nodes as said background nodes or said non-background nodes based on said nodes matching said color of print media.

19. The system according to claim 18, said processor multiplying said second color space values varies said percentage based on how closely said nodes match said color of print media.

20. The system according to claim 17, further comprising a user interface directly or indirectly connected to said processor,
    said user interface obtaining user feedback for said printed document, and
    said processor varying said percentage based on said user feedback.

* * * * *